United States Patent [19]

Iida

[11] Patent Number: 4,664,295
[45] Date of Patent: May 12, 1987

[54] SPOUT FOR LIQUID CONTAINER

[76] Inventor: Motoyori Iida, 106, Kasugaoka 4-chome, Itami-shi, Hyogo, Japan

[21] Appl. No.: 822,615

[22] Filed: Jan. 27, 1986

[30] Foreign Application Priority Data

Jan. 29, 1985 [JP] Japan .............................. 60-11867[U]

[51] Int. Cl.⁴ ............................................. B67D 1/16
[52] U.S. Cl. .................................... 222/109; 222/571; 220/85 SP
[58] Field of Search .................................. 220/85 SP; 222/108–109, 478, 547, 564, 566, 568, 571

[56] References Cited

U.S. PATENT DOCUMENTS

| | | | |
|---|---|---|---|
| 2,793,790 | 5/1957 | Kahler | 222/109 |
| 3,833,150 | 9/1974 | Visser-Patings | 222/109 |
| 4,078,700 | 3/1978 | Hidding | 222/109 |
| 4,298,145 | 11/1981 | Iida | 222/478 |
| 4,550,862 | 11/1985 | Barker et al. | 222/109 |

FOREIGN PATENT DOCUMENTS 1053204 2/1954 France ............................ 222/571
361110 11/1931 United Kingdom ............ 222/109

Primary Examiner—Joseph J. Rolla
Assistant Examiner—Michael S. Huppert
Attorney, Agent, or Firm—Wenderoth, Lind & Ponack

[57] ABSTRACT

A spout for a liquid container which has an outer tube and an inner tube and which can hold drip from the spout without allowing it to flow over the upper edge of the outer tube and can be molded by use of a metal mold simple in construction. A plurality of reservoir forming members are arranged along the inner wall of the inner tube at regular spacings so as to extend vertically. The liquid on the guide plate between the inner tube and the outer tube is trapped in the reservoirs formed by the reservoir forming members.

2 Claims, 9 Drawing Figures

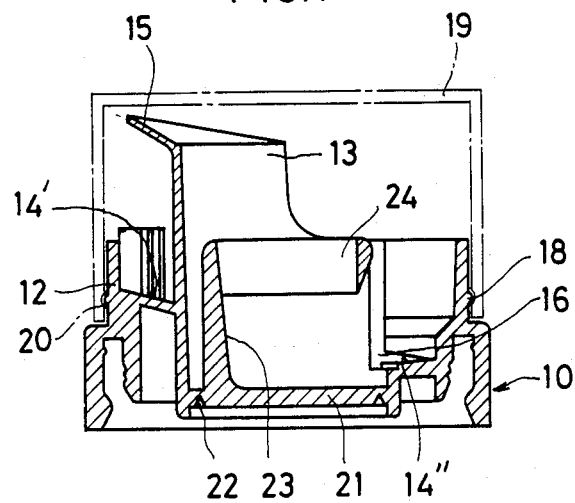
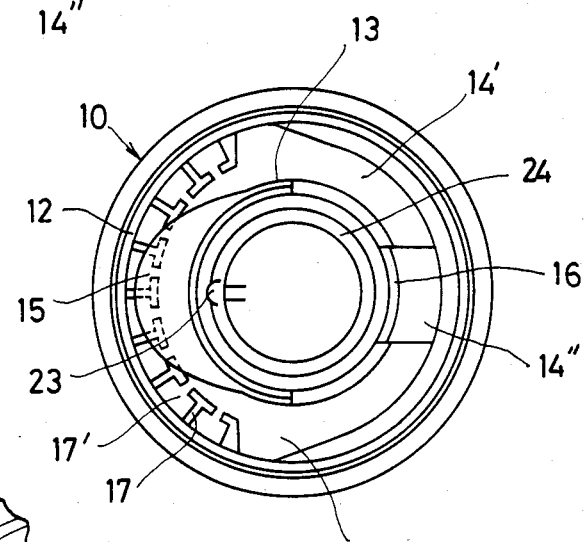
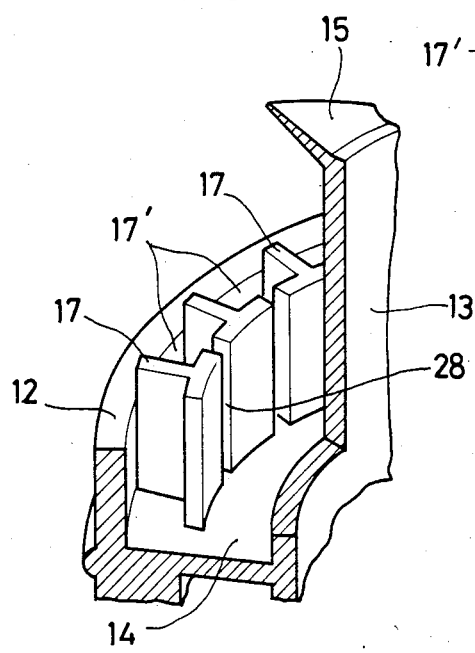

SPOUT FOR LIQUID CONTAINER

BACKGROUND OF THE INVENTION

The present invention relates to an improved spout attached to the mouth of a container for liquid such as cooking oil.

When pouring e.g. cooking oil from a conventional container such as bottle or the like, part of the oil often drips down on the outer surface of the container, dirtying the container, a hand holding the container, a table, etc.

The inventor of the present invention proposed a spout disclosed in his U.S. Pat. No. 4,298,145, as shown in FIGS. 7 and 8. It comprises an outer tube 2 adapted to fitted on the mouth of a liquid container A, an inner tube 3 provided inside of the outer tube 2, and a tapered guide plate 4 formed between the outer tube 2 and the inner tube 3 to close the gap therebetween. A tongue 5 is formed on the top edge of the inner tube 3 so as to protrude outwardly. The outer tube 2 is formed with a baffle plate 6 on its top edge under the tongue 5 so as to protrude inwardly. The baffle plate 6 is of a crescent shaped and becomes thinner and thinner toward its tip. The guide plate 4 is formed with a hole 7 at a side opposite to the baffle plate 6 so as to communicate with the inside of the container. The guide plate 4 is tapered downwardly toward the hole 7. The liquid such as oil remaining on the guide plate 4 is prevented by the baffle plate 6 from flowing out over the upper edge of the outer tube 2, dirtying the table.

The above-described conventional spout successfully solved the above-said problem, but was not satisfactory in the ease of molding. Since the baffle plate 6 is formed on only part of the whole periphery of the outer tube 2 and protrudes inwardly, it is liable to get damaged when removing the portions of the metal mold, though due to its flexibility of synthetic resin it is possible to remove the mold sections while bending the baffle plates 6 upwardly. Therefore, defective parts are often produced. To avoid this, the metal mold is formed as shown in FIG. 9. It comprises a lower mold 31, a lower pin 32 on which the lower mold 31 is mounted, an upper mold 33 movable away from the lower mold 31, an upper pin 35 vertically movable into the upper mold 33, and block molds 36, 37 of a semi-circular shape inserted under the upper mold 33. Molten resin is poured into the molding space formed by setting these mold sections. After the resin has set, the upper mold 33 is disengaged from the block molds 36, 37 and the upper and lower pins 32, 35 are moved in the direction of arrow in FIG. 9. The upper mold 33 is then moved upwardly. One block mold 36 is removed upwardly and the other block mold 37 is turned to the space that has been occupied by the block mold 36, and is moved up.

By dividing the core mold into the block molds 36, 37, the possibility of damaging the baffle plate is decreased. However, this increases the number of the molds used. Also, the necessity of turning the mold 37 during the mold removal increases the accuracy required, shortens the life of mold, and increases the cost of the mold.

SUMMARY OF THE INVENTION

An object of the present invention is to provide a spout for a liquid container which can be easily molded.

In accordance with the present invention, a plurality of reservoir forming members are formed on the inner wall of the outer tube to form a plurality of reservoirs. All of the reservoir forming members extend vertically. So, the metal mold is simpler in construction. This decreases the manufacturing cost of the spout.

BRIEF DESCRIPTION OF THE DRAWINGS

Other objects and features of the present invention will become apparent from the following description taken with reference to the accompanying drawings, in which:

FIG. 1 is a sectional front view of a spout embodying the present invention;
FIG. 2 is a plan view thereof;
FIG. 3 is a perspective view of a portion thereof.

DETAILED DESCRIPTION OF THE PREFERRED EMBODIMENTS

Figure 4:
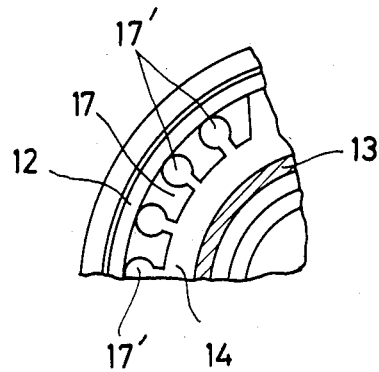
FIGS. 4 and 5 are plan views of a portion of other embodiments.

Referring to FIGS. 1-3, a spout 10 of the present invention comprises an outer tube 12 adapted to be fitted on the mouth of a container in which a liquid is contained, an inner tube 13 formed inside of the outer tube 12, and a guide plate 14 closing the gap between the outer tube 12 and the inner tube 13.

The inner tube 13 is formed on its upper edge with a crescent-shaped tongue 15 projecting outwardly and upwardly. The peripheral wall of the inner tube 13 gradually becomes lower toward the side opposite to the tongued side, terminating as a cutout 16.

On the inner peripheral surface of the outer tube 12 under the tongue 15 (FIG. 2), a plurality of reservoir forming members 17 of a substantially T-shaped cross-section are formed at regular intervals with slits 28 left therebetween, so that a plurality of liquid reservoirs 17' are formed between the reservoir forming members 17. The members extend upwardly and vertically from the guide plate 14. Their top edge may be above, below or flush with the top edge of the outer tube 12.

The guide plate 14 has a first tapered surface 14' tapering down from the bottom of the reservoir 17' toward the cutout 16 of the inner tube 13 and a second tapered surface 14'' countinuous from the first tapered surface and tapering down inwardly from the side opposite to the reservoir forming members 17. In other words, the top surface of the guide plate 14 tapers down toward the hole of the guide plate 14 from all sides, so that the liquid on the guide plate 14 will flow through its hole at bottom of the cutout 16 into the container.

The outer tube 12 is formed with a male screw thread 18 on its outer periphery. A cap 19 shown in FIG. 1 by a dotted line is formed with a female screw thread 20 on its inner periphery to be threadedly engaged on the outer tube. The cap 19 serves to prevent dust from entering the spout.

The bottom of the inner tube 13 is closed by a shut-off plate 21 integrally formed with the inner tube 13 to prevent dust from entering the container. The shut-off plate 21 is formed in its underside with a circular groove 22 of a V-shaped cross section. It is also formed on its upper side with a projection 23 vertically extending and having a ring 24 at its upper end. By pulling the ring 24 with a finger in it, the portion of the shut-off plate 21 within the V-shaped annular groove 22 will be peeled off, so that the inner tube 13 will be opened. Now, the liquid in the container can be poured out through the spout 10 of the present invention.

Figure 6:
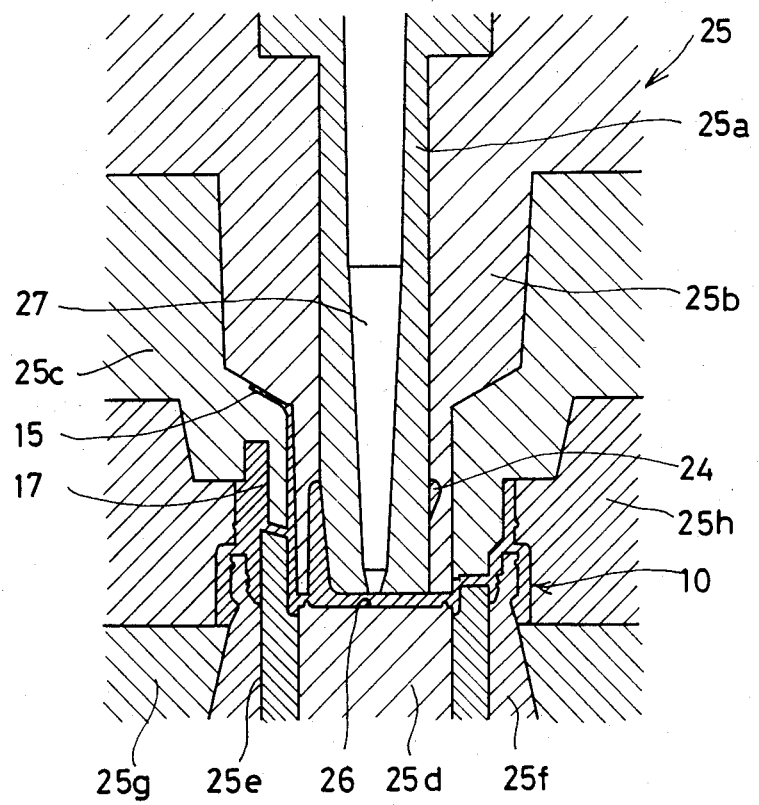
FIG. 6 is a sectional front view of the metal mold used for molding the embodiment of FIG. 1.
Figure 7:
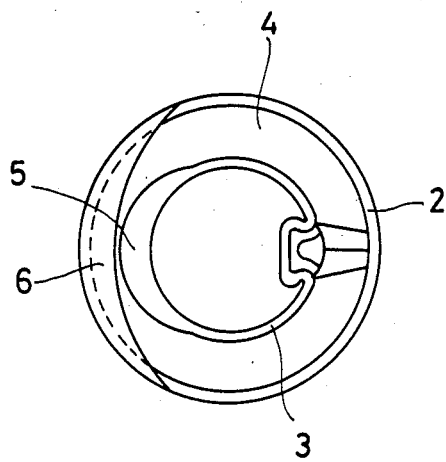
FIG. 7 is a plan view of a conventional spout.
Figure 8:
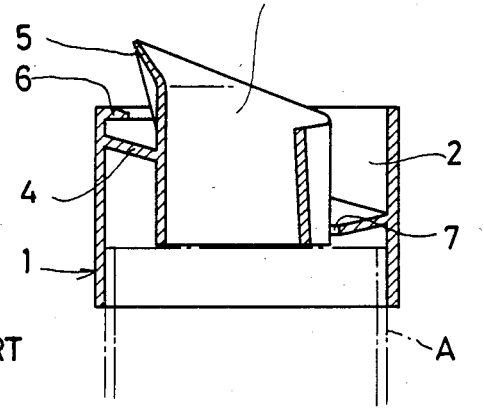
FIG. 8 is a sectional front view thereof.

The spout 10 of such a structure as described above may be integrally molded from synthetic resin by use of a metal mold 25 shown in FIG. 6. The metal mold 25 comprises portions 25a to 25h, all of which are to be removed in a vertical direction. With all of these portions set to form the metal mold 25, molten synthetic resin is poured through a gate 27 into a molding space 26. After the resin has set, the mold 25 is opened by removing the mold portions in the order of 25a, 25b, 25c, . . . . . 25h.

Although the portion for the tongue 15 covers the mold portion 25c (FIG. 6), this does not offer any problem, because the portion 25c is removed after the portions 25a and 25b have been removed. The mold can be opened smoothly because the tongue portion 15 can bend toward the space from which the portion 25b has been removed, without hindering the removal of the portion 25c.

Figure 9:
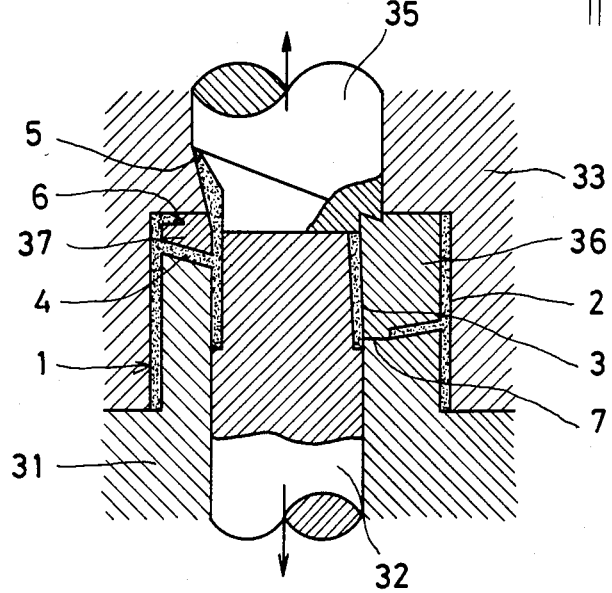
FIG. 9 is a sectional view of the metal mold used for molding the conventional spout of FIG. 7.

The metal mold shown in FIG. 6 has a greater number of portions than the conventional metal mold shown in FIG. 9. This is because the spout 10 of the present invention is provided with a shut-off plate 21.

In use, when the spout 10 with the shut-off plate 21 removed is fitted on a liquid container and the latter is tilted with the tongued side under, the liquid in the container will flow out of the container through the inner tube 13 of the spout 10 from the tongue 15.

In filling the container with liquid, when the flow speed is high, it will flow from tip of the tongue 15, drawing a parabolic line. No part of the liquid flows along the underside of the tongue and the outer periphery of the inner tube 13. When the flow speed is low such as when the filling comes near to its end, part of the liquid tends to flow from the tip of the tongue 15 to its underside or drip from its tip directly on to the guide plate 14. This tendency is particularly marked for liquids having a high viscosity.

With the spout 10 of the present invention, even if part of the liquid flows inwardly along the underside of the tongue 15 and down on the outer wall of the inner tube 13, it flows on the first tapered surface 14' and then on the second tapered surface 14" of the guide plate 14 and goes back into the container through the bottom of the cutout portion 16 of the inner tube 13.

If the filling operation is restarted with some amount of the liquid remaining on the guide plate 14, the remaining liquid will flow in a reverse direction on the guide plate 14, entering the reservoirs 17' through the slits 28 between the reservoir forming members 17. The liquid which has entered the reservoir 17' will be trapped in it by action of surface tension of the liquid without flowing out even though the container with the spout is tilted. This will be understood by considering a square pipe closed at one end thereof and provided with a narrow slit extending axially. If such a pipe containing a liquid in it is tilted, the liquid will not spill easily, depending on the width of the slit, shape of pipe, viscosity of liquid, etc. With the spout of the present invention, each reservoir 17' is closed at one end by the guide plate 14.

In pouring the liquid, the tongue 15 serves to indicate the direction of pouring. The reservoirs 17' disposed under the tongue 15 serve to hold or trap the liquid which has flown along the underside of the tongue, preventing the liquid from flowing over the top edge of the outer tube 12.

The number of the reservoirs 17' and thus of the reservoir forming members 17 should be decided according to the amount of liquid which there can be on the guide plate 14. If the amount of liquid is too large for the capacity of the reservoirs 17', the liquid may flow out of the reservoirs.

The cross section of the reservoirs and the width of the slits 28 should be decided according to the viscosity of liquid, and the wetting of the reservoirs with respect to the liquid.

Figure 5:
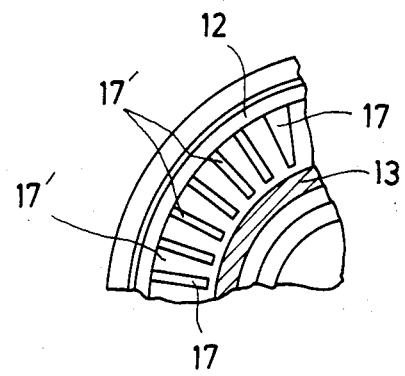

FIGS. 4 and 5 show other embodiments in which different reservoirs 17' are formed between the reservoir forming members 17.

Although the first embodiment uses the reservoir forming members of a substantially T-shaped cross section, the members of an L-shaped cross section may be used.

What is claimed is:

1. A spout for a liquid container, comprising:
   an outer tube adapted to be fitted on the mouth of the liquid container;
   an inner tube disposed inside of said outer tube;
   a guide plate disposed between said outer tube and said inner tube closing the gap therebetween;
   said inner tube being formed with a tongue on an upper edge thereof so as to protrude outwardly and with a cutout portion at the side opposite to said tongue so as to communicate with the inside of the liquid container;
   said guide plate tapering downwardly toward the bottom of said cutout portion; and
   a plurality of reservoir forming means formed along the inner wall of said outer tube with slits formed therebetween so as to form a plurality of reservoirs between said inner tube and said outer tube, said reservoir forming means extending vertically from the upper surface of said guide plate.

2. A spout as claimed in claim 1, wherein said reservoirs are the narrowest at said slits.

* * * * *